(12) United States Patent
Prasad

(10) Patent No.: US 6,324,205 B1
(45) Date of Patent: Nov. 27, 2001

(54) SCALABLE METHOD FOR GENERATING LONG CODES USING GOLD SEQUENCES

(75) Inventor: Mohit K. Prasad, San Diego, CA (US)

(73) Assignees: Sony Corporation (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/566,907

(22) Filed: May 9, 2000

Related U.S. Application Data

(60) Provisional application No. 60/133,379, filed on May 10, 1999.

(51) Int. Cl.$^7$ ..................................................... H04B 1/69
(52) U.S. Cl. ............................................. 375/130; 708/253
(58) Field of Search ............................ 375/130; 708/250, 708/253; 714/739; 380/46; 331/78

(56) References Cited

U.S. PATENT DOCUMENTS

| | | | |
|---|---|---|---|
| 5,068,872 | * 11/1991 | Schroter | 375/130 |
| 5,629,955 | * 5/1997 | McDonough | 375/130 |
| 5,790,891 | * 8/1998 | Gold et al. | 375/141 |
| 5,796,776 | * 8/1998 | Lomp et al. | 375/222 |

OTHER PUBLICATIONS

Laird, et a; "Additional Information on the Motorola 3X Long Code Generator"; Data Sheet; TR45.5.3.1/99.04.20.07, Apr., 1999, pp. 1–4.

Ramesh, et al.; "A Modified Long Code Generation Method for Spreading Rate 3"; 1999, Data Sheet TR45.5.3.1/99.04.20.08, Apr. 20, 1999, pp. 1–6.

Massey. "Shift–Register Synthesis and BCH Decoding"; IEEE Transactions on Information Theory, vol. IT–15, No. 1, Jan. 1969, pp. 122–127.

\* cited by examiner

*Primary Examiner*—Don N. Vo
(74) *Attorney, Agent, or Firm*—Skjerven Morrill MacPherson LLP; David W. Heid

(57) ABSTRACT

A scalable method and system for generating a 3X long code sequence for use in a CDMA communication system uses Gold sequences. A preferred pair of 1X long code sequences both running at 1.2288 Mchips/s are used to generate the 3X sequence. The 3X sequence so generated is a pseudo-random sequence with well defined auto-correlation and cross-correlation properties. Because the method is scalable it is easily scaled to generate other long code e.g. 6X, 9X, and 12X sequences.

6 Claims, 2 Drawing Sheets

SCALABLE METHOD FOR GENERATING LONG CODES USING GOLD SEQUENCES

CROSS REFERENCE TO RELATED APPLICATION

This application claims the benefit of U.S. Provisional Application No. 60/133,379, filed May 10, 1999 and is incorporated herein by reference in its entirety.

FIELD OF THE INVENTION

The present disclosure relates to spread spectrum communication systems and, in particular, to generation of long code sequences in spread spectrum communication systems.

BACKGROUND OF THE INVENTION

Long code sequences are widely used in communication systems to spread and despread the data-modulated carrier. Both 1X and 3X long code sequences are used in spread spectrum communication systems.

A 3X long code sequence is typically generated from its 1X counterpart. For example, the method proposed by Laird et al. (see "Additional information on Motorola 3X long code generator," by K. Laird, J. Chen, and F. Zhou (Motorola), TR45.5.3.1/99.04.20.07, April 1999, Savannah, Ga.) as well as that proposed by Ramesh et al. (see "A modified long code generation method for spreading rate 3," by N. Ramesh and Q. Li (Lucent), TR45.5.3.1/99.04.20.08, April 1999, Savannah, Ga.) entail taking shifted versions of the 1X long code at 1.2288 Mchips/sec and interlacing them to generate a 3X long code sequence at 3.6864 Mchips/sec. However, the auto-correlation function of the 3X long code sequences generated by either of the above methods are prohibitively high, leading to undesirable interference problems.

In the method proposed by Laird et al., the magnitude of auto-correlation of the generated 3X sequence can be varied by the degree of shift of the starting 1X sequence thus allowing for improvement in the auto-correlation magnitude. In the method proposed by Ramesh, however, the shift values are unknown, leading to unacceptable auto-correlation levels.

In a publication entitled "Long code generators for 3X systems" (see R. T. Derryberry and Mohit K. Prasad, "Long code generators for 3X systems," TR45.5.3.1 Adhoc/99.04.28.0x, Apr. 28, 1999, Teleconference), the authors describe a scalable method for generating long code sequences. Because the system is scalable, the number of long code generators scales linearly with the type of system in use. For example, the method generates 3 long code sequences for 3X systems, 6 long code sequences for 6X systems, etc. However, the method described by Derryberry et al. requires that multiple long code states be initialized or exchanged during signaling.

Accordingly, it would be advantageous to generate a long code sequence which is not subject to the infirmities of the existing methods and systems.

SUMMARY OF THE INVENTION

A scalable method for generating a KX long code sequence—where K is an integer multiple of 3— includes: (i) generating a preferred pair of m-sequences b(d) and b'(D) each of which is a 1X long code sequence of length N, wherein $N=2^n-1$; (ii) forming sequence [b(d)+b'(D)] by modulo 2 adding sequences b(d) and b'(D); (iii) delaying the sequence b'(D) by a predefined amount of time by each of [1, 2, 3 ... (K−4),(K−3)] times to thereby form (K−3) delayed sequences Db'(D), $D^2$b'(D), $D^3$b'(D) ... $D^{(K-4)}$b'(D), $D^{(K-3)}$b'(D); (iv) modulo 2 adding the sequence b(d) to each of the (K−3) delayed sequences to thereby form (K−3) sequences [b(D)+Db'(D)], [b(D)+$D^2$b'(D)], [b(D)+$D^3$b'(D)], . . . , [b(D)+$D^{(K-4)}$b'(D)], [b(D)+$D^{(K-3)}$b'(D)]; (v) generating a KX clock signal whose frequency is K times that of a clock signal used to generate the 1X sequences b(d) and b'(d); (vi) recurrently within each K transitions of the KX clock sequentially setting an with bit of the KX sequence to an with bit of one of the K sequences b(D), [b(D)+b'(d)], b'(D), [b(D)+Db'(D)], [b(D)+$D^2$b'(D)], [b(D)+$D^3$b'(D)], . . . , [b(D)+$D^{(K-4)}$b'(D)], [b(D)+$D^{(K-3)}$b'(D)] sequentially.

When K is equal to 3 and N is equal to 42, the method, in accordance with one embodiment includes: (i) generating a preferred pair of m-sequences b(D) and b'(D) each being of the length $(2^{42}-1)$; (2) forming the sequence [b(D)+b'(d)] by performing modulo 2 addition on sequences b(d) and b'(d); (3) setting the (i+1)th bit of sequence 3X, where i is a multiple of 3 and varies between 0 and 42, equal to (i+1)th bit of the sequence b(D) at every (i+1)th transition of a clock signal running at the rate of 3.6864 Mchips/s; (4) setting the (i+2)th bit of sequence 3X equal to the (i+1)th bit of the sequence [b(D)+b'(D)] at every (i+2)th transition of the clock signal; (5) setting the (i+3)th bit of sequence 3X equal to the (i+1)th bit of the sequence b'(D) at every (i+2)th transition of the clock signal.

A system for generating a 3X long Code sequence, in accordance with one embodiment, includes two 1X long code sequence generators for generating the preferred pairs b(D) and b'(D), a modulo 2 adder for generating sequence [b(D) and b'(D)] and a 3-input multiplexer. The signals generated by sequences b(d), b'(D) and [b(D)+b'(D)] are coupled to input terminals of the multiplexer, while a 2-bit SELECT signal operating at the rate of 3.6864 Mchips/s is applied to the select input terminal of the multiplexer.

During every three transitions of signal SELECT a bit respectively from the three sequences b(D), b'(D) and [b(D)+b'(d)], is passed from the multiplexer's input terminal to its output terminal, thereby generating the 3X long code sequence at the output terminal of the multiplexer.

When K is equal to 6 and N is equal to 42, the method includes: (1) generating a preferred pair of m-sequences b(D) and b'(D) each being of the length $(2^{42}-1)$; (2) forming the sequence [b(D)+b'(d)] by performing modulo 2 addition on sequences b(d) and b'(d); (4) forming three delayed sequences of b'(D), namely sequences Db'(D), $D^2$b'(D) and $D^3$b'(D) (5) modulo 2 adding sequence b(D) with each of the delayed b'(D) sequences to thereby generate sequences [b(D)+Db'(d)], [b(D)+$D^2$b'(d)], [b(D)+$D^3$b'(d)]; (6) setting the (i+1)th bit of sequence 6X, where i is a multiple of 6 and varies between 0 and 42, equal to (i+1)th bit of the sequence b(D) at every (i+1)th transition of a clock signal running at the rate of 7.3728 Mchips/s; (7) setting the (i+2)th bit of sequence 6X equal to the (i+1)th bit of the sequence [b(D)+b'(D)] at every (i+2)th transition of the clock signal; (8) setting the (i+3)th bit of sequence 6X equal to the (i+1)th bit of the sequence b'(D) at every (i+3)th transition of the clock signal; (9) setting the (i+4)th bit of sequence 6X equal to the (i+1)th bit of the sequence [b(D)+Db'(D)] at every (i+4)th transition of the clock signal; (10) setting the (i+5)th bit of sequence 6X equal to the (i+1)th bit of the sequence [b(D)+$D^2$b'(D)] at every (i+5)th transition of the clock signal; and (11) setting the (i+6)th bit of sequence 6X equal to the (i+1)th bit of the sequence [b(D)+$D^3$b'(D)] at every (i+6)th transition of the clock signal.

DETAILED DESCRIPTION

Figure 1:
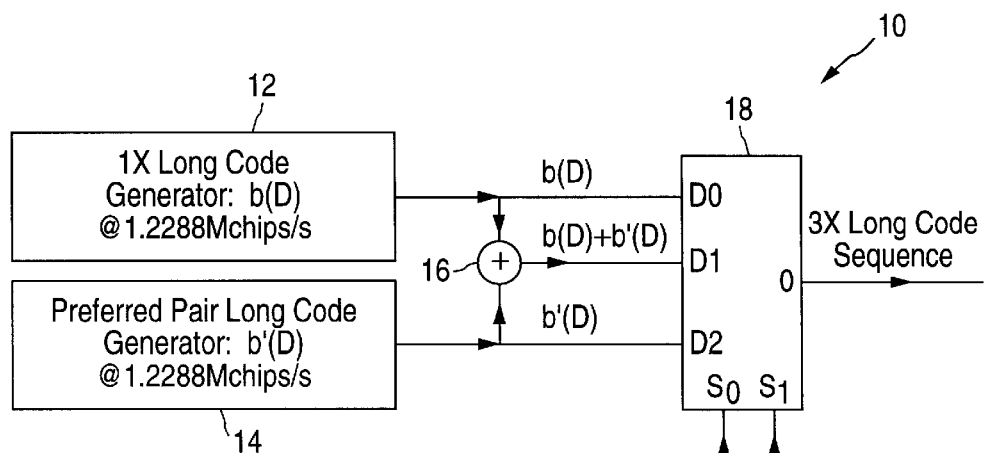
FIG. 1 shows a block diagram of a 3X long code sequence generator, in accordance with one embodiment.

A scalable method and system, in accordance with this disclosure, uses 1X Gold sequences to generate 3X long code sequences for use in code division multiple access (CDMA) system. Because the method and system are scalable, they also generate long code sequences for e.g. 6X, 9X or 12X CDMA systems.

Assume a long code sequence y(n) of length 3N for a 3X system as follows:

$$y(n) = \begin{cases} \lambda_0(\lfloor n/3 \rfloor), & n\%3 = 0; \\ \lambda_1(\lfloor n/3 \rfloor), & n\%3 = 1; \\ \lambda_2(\lfloor n/3 \rfloor), & n\%3 = 2. \end{cases} \quad (1)$$

where $\lambda_i(n), i=0,1,2$ are three independent pseudo-random 1X sequences running at 1.2288 Mchips/s, each of length $N=2^{42}-1$. In expression (1), the notation $(\lfloor n/3 \rfloor)$ designates the integer part resulting from dividing integer n by 3 (i.e., the quotient) and the notation n%3 designates modulus 3 operation.

Given expression (1), it is apparent to those skilled in the art that the auto-correlation function $\rho_{NEW}(k), k=0,\pm 1, \ldots, \pm(3N-1)$ of y(n) is given by:

$$\rho_{NEW}(k) = \begin{cases} \frac{1}{3}(\rho_{00}(l) + \rho_{11}(l) + \rho_{22}(l)), & k = 3l; \\ \frac{1}{3}(\rho_{01}(l) + \rho_{12}(l) + \rho_{20}(l+1)), & k = 3l+1; \\ \frac{1}{3}(\rho_{02}(l) + \rho_{10}(l+1) + \rho_{21}(l+1)), & k = 3l+2. \end{cases} \quad (2)$$

where $\rho_{ij}(l), i,j=0,1,2$ is the correlation between the sequences $\lambda_i(n)$ and $\lambda_j(n)$ over a period of N chips and where the correlation values for non-zero values of l, depends on the sequences $\lambda_i(n), i=0,1,2$.

Assume that sequences $\gamma_A(n)$ and $\gamma_B(n)$ respectively representing users A and B are given by:

$$y_A(n) = \begin{cases} \lambda_{A0}(\lfloor n/3 \rfloor), & n\%3 = 0; \\ \lambda_{A1}(\lfloor n/3 \rfloor), & n\%3 = 1; \\ \lambda_{A2}(\lfloor n/3 \rfloor), & n\%3 = 2. \end{cases} \quad (3)$$

and $$y_B(n) = \begin{cases} \lambda_{B0}(\lfloor n/3 \rfloor), & n\%3 = 0; \\ \lambda_{B1}(\lfloor n/3 \rfloor), & n\%3 = 1; \\ \lambda_{B2}(\lfloor n/3 \rfloor), & n\%3 = 2. \end{cases} \quad (4)$$

The cross-correlation of the two sequences $y_A(n)$ and $y_B(n)$ is given by:

$$\rho_{AB}(k) = \begin{cases} \frac{1}{3}(\rho_{A0,B0}(l) + \rho_{A1,B1}(l) + \rho_{A2,B2}(l)), & k = 3l; \\ \frac{1}{3}(\rho_{A0,B1}(l) + \rho_{A1,B1}(l) + \rho_{A2,B2}(l+1)), & k = 3l+1; \\ \frac{1}{3}(\rho_{A0,B2}(l) + \rho_{A1,B0}(l+1) + \rho_{A2,B1}(l+1)), & k = 3l+2. \end{cases} \quad (5)$$

where the term $\rho_{Ai,Bj}(l)$ represents the cross-correlation between the $i^{th}, i=0,1,2$ subsequence (i.e., $\lambda_{A0}, \lambda_{A1}$ and $\lambda_{A2}$) of sequence $y_A$ with the $j^{th}, j=0,1,2$ subsequence (i.e., $\lambda_{B0}, \lambda_{B1}$ and $\lambda_{B2}$) of sequence $y_B$. Note that each of the $\lambda$ subsequences is a 1X sequence running at the rate of 1.2288 Mchips/s.

As seen from (3), (4) and (5), the cross-correlation of the two interlaced sequences $y_A$ and $y_B$ is determined by the cross-correlations of their component sequences $\lambda_{A0}, \lambda_{A1}, \lambda_{A2}, \lambda_{B0}, \lambda_{B1}, \lambda_{B2}$, each of which may have many values thus complicating the use of sequences $y_A$ and $y_B$ in e.g. CDMA 2000 (see *Physical Layer Standard for CDMA 2000 Spread Spectrum Systems*, TR45, PN-4429, published as IS-2000.2, Dec. 15, 1999) 3X system.

It is shown below, in accordance with this disclosure, that by using Gold sequences, the cross-correlation values for CDMA 2000 3X systems is guaranteed to take only three values each being less than or equal to $2^{-20}$.

In the description below references are made to the following subjects: maximal-length sequences (also known as m-sequences), decimated sequences, preferred pair sequences and Gold codes. Each of these subjects is described in "Introduction to Spread Spectrum Communication" by Roger L. Peterson, Rodger E. Ziemer, David E. Broth, 1995, Prentice Hall, Upper Saddle River, N.J., 07458, pages 113–138, which pages are incorporated herein by reference in their entirety.

Consider a 1X long code m-sequence b(D) with period $N=2^n-1$ chips and running at 1.2288Mchips/s, where n is equal to 42. The decimated sequence b'(D) of period $N=2^n-1$ chips is obtained by taking every qth sample of b(D).

The sequences b(D) and b'(D) are called preferred pairs of m-sequences if the following conditions hold:
1) n#0 mod 4; i.e. n is odd or n=2 mod 4;
2) The decimation factor q is odd and is relatively prime to the period $N=2^{42}-1$
3) the decimation factor q is odd and either $$q=2^k+1$$

or $$q=2^{2k}-2^k+1$$

4) gcd(n,k)=
   1 for n odd
   2 for n=2 mod 4
where gcd stands for the greatest common denominator Since, in accordance with this embodiment, n is selected as 42 and q is selected as 5 (i.e., $2^2+1$), all of the above conditions are satisfied. Therefore, with n=42 and q=5, b(D) and b'(D)=b[5] form a preferred pair of m-sequences having a period $N=2^n-1$ chips.

Consider the family of codes defined by the set $$\Gamma = \{b(D), b'(D), b(D) \oplus b'(D), b(D)+Db'(D), b(D)+D^2b'(D), \ldots, b(D)+D^{N-1}b'(D)\}$$

which is also known as Gold codes. Gold codes have the property that any distinct pair of codes y and z in the set Γ have a three valued cross-correlation denoted by $\rho_{yz}(k)$. These values are given by:

$$\rho_{yz}(k) = \begin{cases} -\frac{1}{N}t(n) \\ -\frac{1}{N} \\ \frac{1}{N}(t(n)-2) \end{cases} \quad (7)$$

for all non-zero values of K where, $t(n) = 1 + 2^{0.5(n+1)}$ when $n$ is odd;

$= 1 + 2^{0.5(n+2)}$ when $n$ is even.

Since n=42

$$\rho_{yz}(k) = \begin{cases} -\frac{2^{22}+1}{2^{42}-1} \approx -2^{-20} \approx -10^{-6} \\ -\frac{1}{2^{42}-1} \approx -2.5 \times 10^{-13} \\ \frac{2^{22}-1}{2^{42}-1} \approx 2^{-20} \approx 10^{-6} \end{cases} \quad (8)$$

for all values of K#0.

The auto-correlation of the elements in set Γ is unity for k=0. When k is not equal to 0, the auto-correlation is found using equation (7) above. Therefore, it is advantageous to use 1X Gold sequences to generate 3X long code sequences, in accordance with this disclosure.

A method and a system, in accordance with this embodiment, for generating a 3X long code sequence from a 1X long code sequence b(D) is described next. First, using the sequence b(D), the decimated sequence b'(D), described above, and the sequence [b(D)+b'(D)] (The '+' signal refers to the modulo 2 addition operation) are generated. The generation of a decimated sequence from a given sequence is known in the art. For example, see J. L. Massey, "Shift Register Synthesis and BCH decoding," IEEE Trans. Inf. Theory, vol. IT-15, pp. 122–127, January 1969, which is incorporated herein by reference in its entirety.

Recurrently, the (i+1)th bit of sequence 3X—where i is a multiple of 3 and varies between 0 and n—is supplied by (i+1)th bit of the sequence b(D) at the (i+1)th transition of a clock signal running at the rate of 3.6864 Mchips/s. The (i+2)th bit of sequence 3X is supplied by (i+1)th bit of the sequence [b(D)+b'(D)] at the (i+2)th transition of the clock signal. The (i+3)th bit of sequence 3X is supplied by (i+3)th bit of the sequence b'(D) at the (i+2)th transition of the clock signal. Therefore, in accordance with this disclosure, each bit of the generated 3X sequence is recurrently supplied by a bit from a different one of the sequences b(D), [b(D)+b'(D)] and b'(D) sequentially.

FIG. 1 shows a block diagram of long Code sequence generator 10, in accordance with one embodiment, for generating a 3X long code sequence.

Long code sequence generator 10 includes 1X long code sequence generator 12 for generating sequence b(D), preferred pair 1X long code generator 14 for generating sequence b'(D), modulo 2 adder 16 and multiplexer (mux) 18. The signals generated by 1X long code sequence generator 12 and preferred pair 1X long code generator 14 are respectively applied to input terminals D0 and D2 of mux 18. Modulo 2 adder 16 receives the signals generated by 1X long code sequence generator 12 and preferred pair 1X long code generator 14 and in response thereto generates and supplies the signal [b(D)+b'(D)] to input terminal D1 of mux 18. A 2-bit signal SELECT is applied to the select input terminals S0 and S1 of multiplexer 18. The 3X long code sequence is generated at output terminal O of mux 18, as described below.

To generate a 3X long code sequence, in accordance with this embodiment, signal SELECT is set to operate at the rate of 3.6864 Mchips/s. With each low-to-high (or high-to-low) transition of signal SELECT, one of the input terminals D0, D1 and D2, respectively in that sequence, is recurrently selected to thereby transfer its signal to output terminal O. Because the selection is recurrent, after every three cycles of signal SELECT, the same input terminal of mux 18 is selected again. Accordingly, during e.g. the first, fourth, seventh, tenth . . . cycle of signal SELECT, input terminal D0 is selected and thus signal b(D) is transferred to output terminal O of mux 18. During e.g. the second, fifth, eight, eleventh, . . . cycle of signal SELECT, input terminal D1 is selected and thus signal [b(D)+b'(D)] is transferred to output terminal O of mux 18. During e.g. the third, sixth, ninth, twelfth, etc . . . cycle of signal SELECT, input terminal D2 is selected and thus signal b'(D) is transferred to output terminal O of mux 18. As stated above, the sequence supplied at output terminal O of mux 18 is the generated 3X long code sequence.

If signal SELECT always selects input terminal D0 and the frequency of the signal SELECT is set to 1.2288 Mchips/sec, the signal supplied at output terminal O of mux 18 is a 1X long code sequence. Therefore, advantageously, long code sequence generator 10 can optionally generate both a 3X and a 1X long code sequence.

Figure 2:
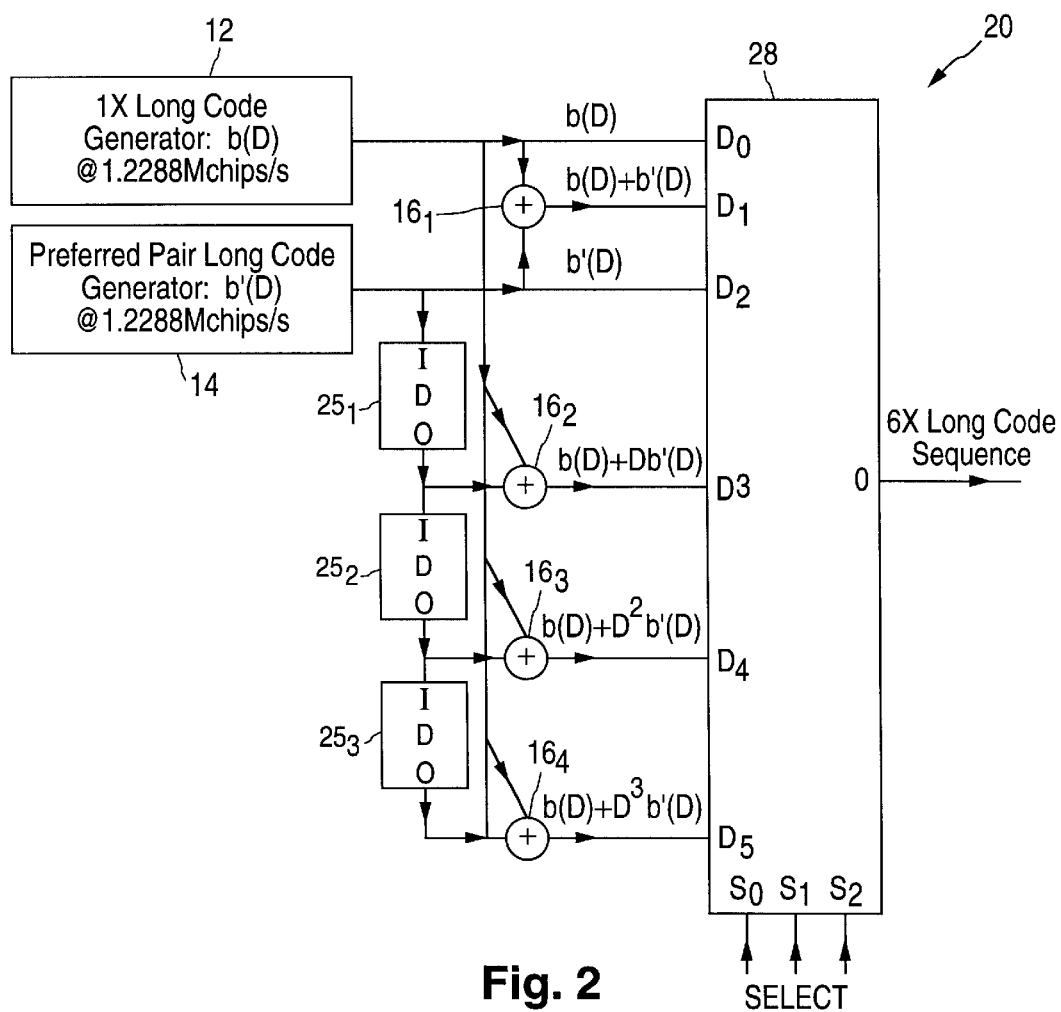
FIG. 2 shows a block diagram of a 6X long code sequence generator, in accordance with one embodiment.

FIG. 2 shows a simplified block diagram of long code sequence generator 20, in accordance with another embodiment, for generating a 6X long code sequence.

Long code sequence generator 20 includes 1X long code sequence generator 12 for generating sequence b(D), preferred pair 1X long code generator 14 for generating sequence b'(D), four modulo 2 adders 16—designated as $16_1 \ldots 16_4$ (the subscript associated with each reference numeral designates the index number of the component identified by that reference numeral)—three delay generators 25—designated as $25_1 \ldots 25_3$—and a 6-input mux 28. The signals generated by 1X long code sequence generator 12 and preferred pair 1X long code generator 14 are respectively applied to input terminals D0 and D2 of mux 18. Signal [b(D)+b'(D)] is applied to input terminal D1 of mux 28.

Each delay generator 25 supplies at its output terminal O the signal it receives at its input terminal I after a predefined delay of δt. For example, delay generator $25_1$ receives signal b'(D) at its input terminal I and supplies that signal to its output terminal after δt. The signal supplied at output terminal O of delay generator $25_1$ is Db'(D), signifying the presence of a delayed replica of signal b'(D) after δt. The signal supplied at output terminal O of delay generator $25_2$ is $D^2b'(D)$, signifying the presence of a delayed replica of signal b'(D) after 2*δt Consequently, input terminals D2, D3 and D4 of mux 28 respectively receive signals [b(d)+Db'(D)], [b(d)+$D^2$b'(D)], [b(d)+$D^3$b'(D)]. Signal SELECT, which is a 3-bit signal, is applied to select input terminals S0, S1 and S2 of mux 28.

To generate a 6X long code sequence, in accordance with this embodiment, signal SELECT is set to operate at the rate of 7.3728 Mchips/s. With each low-to-high (or high-to-low)

transition of signal SELECT, recurrently one of the input terminals D0, D1, D2, D3, D4 and D5, respectively in that sequence (i.e., sequentially) is selected to provide its signal to output terminal O. Because the selection is recurrent, after every six cycles of signal SELECT, the same input terminal to mux 28 is selected. Accordingly, during e.g. the 1st, 7th, 13th, 19th, . . . cycles of signal SELECT, input terminal D0 is selected and thus signal b(D) is transferred to output terminal O of mux 28. During e.g. the 2nd, 8th, 14th, 20th, . . . cycles of signal SELECT, input terminal D1 is selected and thus signal [b(D)+b'(D)] is transferred to output terminal O of mux 28. During e.g. the 3rd, 9th, 15th, 21st, . . . cycles of signal SELECT, input terminal D2 is selected and thus signal b'(D) is transferred to output terminal O of mux 28. During e.g. the 4th, 10th, 16th, 22nd, . . . cycles of signal SELECT, input terminal D3 is selected and thus signal [b(D)+Db'(D)] is transferred to output terminal O of mux 28. During e.g. the 5th, 11th, 17th, 23rd, . . . cycles of signal SELECT, input terminal D4 is selected and thus signal [b(D)+$D^2$b'(D)] is transferred to output terminal O of mux 28. During e.g. the 6th, 12th, 18th, 24th, . . . cycles of signal SELECT, input terminal D5 is selected and thus signal [b(D)+$D^3$b'(D)] is transferred to output terminal O of mux 28.

In accordance with embodiment 20, the sequence supplied at output terminal O of mux 28 is a 6X long code sequence.

If signal SELECT always selects input terminal D0 and the frequency of the signal SELECT is set to 1.2288 Mchips/sec, the signal supplied at output terminal O of mux 28 is a 1X long code sequence. Therefore, advantageously, long code sequence generator 20 can optionally generate both a 6X and a 1X sequence.

Figure 3:
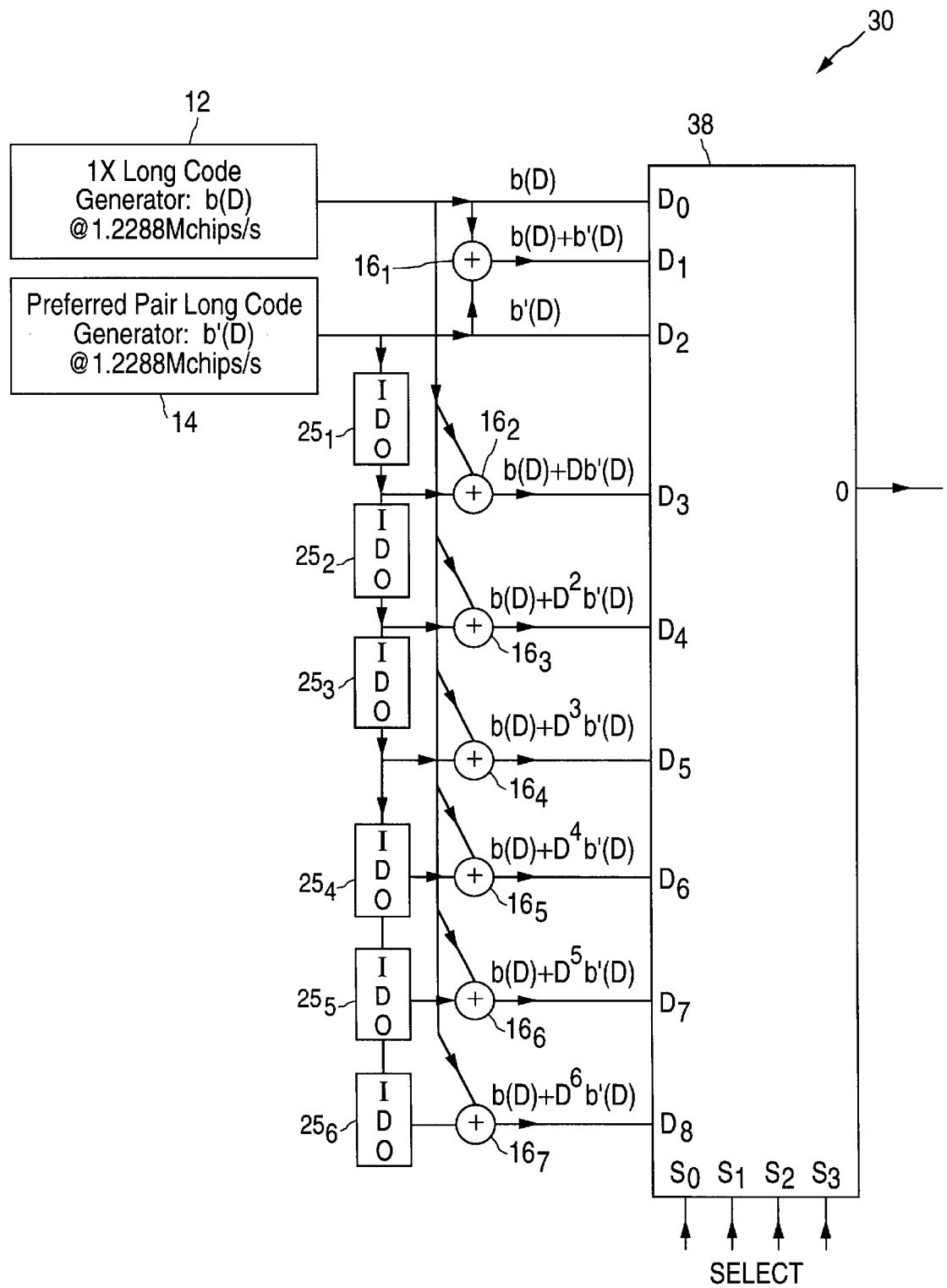
FIG. 3 shows a block diagram of a 9X long code sequence generator, in accordance with one embodiment.

FIG. 3 shows a simplified block diagram of long Code sequence generator 30, in accordance with another embodiment for generating a 9X long code sequence.

Long code sequence generator 30 includes 1X long code sequence generator 12 for generating sequence b(D), preferred pair 1X long code generator 14 for generating sequence b'(D), seven modulo 2 adders 16—designated as $16_1$ . . . $16_7$—six delay elements 25—designated as $25_1$ . . . $25_6$—and a 9-input mux 38.

The signals generated by 1X long code sequence generator 32 and preferred pair 1X long code generator 34 are respectively applied to input terminals D0 and D2 of mux 18. Signal [b(D)+b'(D)] is applied to input terminal D1 of mux 38.

Input terminals D3–D8 of mux 38 respectively receive signals [b(d)+Db'(D)], [b(d)+$D^2$b'(D)], [b(d)+$D^3$b'(D) ], [b(d)+$D^4$b'(D)], [b(d)+$D^5$b'(D)], and [b(d)+$D^6$b'(D) ].

Signal SELECT, which is a 4-bit signal, is applied to select input terminals S0, S1, S2 and S3 of mux 38. The 9X long code sequence is generated at output terminal O of mux 38, as described below.

To generate a 9X long code sequence, in accordance with this embodiment, signal SELECT is set to operate at the rate of 11.0592 Mchips/s (i.e., 9×1.2288 Mchips/s). With each low-to-high (or high-to-low) transition of signal SELECT, one of the input terminals D0, D1, D2, D3, D4, D5, D6, D7 and D8, sequentially provides its signal to output terminal O. Because the selection is recurrent, after every ten cycles of signal SELECT, the same input terminal to mux 38 is selected. Accordingly, during e.g. the 1st, 10th, 20th, 30th, . . . cycles of signal SELECT, input terminal D0 is selected and thus signal b(D) is transferred to output terminal O of mux 38. During e.g. the 2nd, 12th, 22nd, 32nd, . . . cycles of signal SELECT, input terminal D1 is selected and thus signal [b(D)+b'(D)] is transferred to output terminal O of mux 38. During e.g. the 3rd, 13th, 23rd, 33rd, . . . cycles of signal SELECT, input terminal D2 is selected and thus signal b'(D) is transferred to output terminal O of mux 38. During e.g. the 4th, 14th, 24th, 34th, . . . cycles of signal SELECT, input terminal D3 is selected and thus signal [b(D)+Db'(D)] is transferred to output terminal O of mux 38. During e.g. the 5th, 15th, 25th, 35th, . . . cycles of signal SELECT, input terminal D4 is selected and thus signal [b(D)+$D^2$b'(D)] is transferred to output terminal O of mux 38. During e.g. the 6th, 16th, 26th, 36th, . . . cycles of signal SELECT, input terminal D5 is selected and thus signal [b(D)+$D^3$b'(D)] is transferred to output terminal O of mux 38. During e.g. the 7th, 17th, 27th, 37th, . . . cycles of signal SELECT, input terminal D6 is selected and thus signal [b(D)+$D^4$b'(D)] is transferred to output terminal O of mux 38. During e.g. the 8th, 18th, 28th, 38th, . . . cycles of signal SELECT, input terminal D7 is selected and thus signal [b(D)+$D^5$b'(D)] is transferred to output terminal O of mux 38. During e.g. the 9th, 19th, 29th, 39th, . . . cycles of signal SELECT, input terminal D8 is selected and thus signal [b(D)+$D^6$b'(D)] is transferred to output terminal O of mux 38.

In accordance with embodiment 30, the sequence supplied at output terminal O of mux 38 is a 9X long code sequence.

If signal SELECT always selects input terminal D0 and the frequency of the signal SELECT is set to 1.2288 Mchips/sec, the signal supplied at output terminal O of mux 38 is a 1X long code sequence. Therefore, advantageously, long code sequence generator 30 can optionally generate both a 6X and a 1X sequence.

The exemplary embodiments of the invention disclosed above are illustrative and not limitative. Although the present disclosure describes long code sequence generation for 3X, 6X and 9X systems, its application to generation of any multiple integer of 3X systems is apparent in view of this disclosure. For example, by increasing e.g. the number of modulo 2 adders and delay elements, a 12X long code sequence using a 1X long code sequence is generated, in accordance with this disclosure. Other embodiments of this invention are possible within the scope of the appended claims.

I claim:

1. A method for generating a KX long code sequence for use in a CDMA communication system, where K is an integer multiple of 3, the method comprising:
   (i) generating a preferred pair of sequences b(d) and b'(D) each being of length N and each being a 1X long code sequence; wherein N=$2^n$–1
   (ii) forming sequence [b(d)+b'(D)] by modulo 2 adding sequences b(d) and b'(D);
   (iii) delaying the sequence b'(D) by a predefined amount (K–3) times to thereby form (K–3) delayed sequences of sequence b'(D);
   (iv) modulo 2 adding the sequence b(d) to each of the (K–3) delayed sequences formed in step (iii)
   (v) generating a KX clock signal whose frequency is K times that of a clock signal used to generate the 1X sequences b(d) and b'(d); and
   (vi) recurrently for each K transitions of the KX clock setting a bit of the KX sequence to an associated one of the bits respectively of sequences b(D)—and [b(D)+b'(d)] and b'(D) and the (K–3) sequences formed in step (iv) sequentially.

2. The method of claim 1 where n is equal to 42.

3. The method of claim 1 where K is one of 3, 6, 9 and 12.

4. A long code sequence generator for generating a KX long code sequence for use in a CDMA communication system, the long code generator comprising:

(i) A pair of 1X long code sequence generators for generating a preferred pair of sequences b(d) and b'(D) each being of length N wherein $N=2^n-1$ (ii) (K−3) delay elements each for delaying the sequence b'(D) to thereby form (K−3) delayed sequences of sequence b'(D)

(iii) (K−2) modulo 2 adders each for modulo 2 adding the sequence b(d) to each one of the b'(D) and the (K−3) delayed sequences formed in step (ii)

(vi) A multiplexer having K input terminals and an output terminal, wherein each input terminal of the multiplexer receives a signal form a different one of the sequences b(D) [b(D)+b'(d)] b'(D) and the (K−3) sequences formed in step (iii)

(iv) A KX clock signal generator having a frequency which is K times that of a clock signal used for generating the 1X sequences b(d) and b'(d); wherein during each K transitions of the KX clock a different one of the N terminals of the multiplexer is sequentially selected.

5. The long code generator of claim 4 where n is equal to 42.

6. The long code generator of claim 4 where K is one of 3, 6, 9 and 12.

* * * * *